(12) United States Patent
Gregory

(10) Patent No.: US 7,619,972 B2
(45) Date of Patent: Nov. 17, 2009

(54) VIDEO SYSTEM

(75) Inventor: Lawrence Gregory, Worthing (GB)

(73) Assignee: Thales UK PLC (GB)

( * ) Notice: Subject to any disclaimer, the term of this patent is extended or adjusted under 35 U.S.C. 154(b) by 466 days.

(21) Appl. No.: 10/571,095

(22) PCT Filed: Aug. 20, 2004

(86) PCT No.: PCT/EP2004/051857
§ 371 (c)(1),
(2), (4) Date: Mar. 8, 2006

(87) PCT Pub. No.: WO2005/025223
PCT Pub. Date: Mar. 17, 2005

(65) Prior Publication Data
US 2007/0003211 A1   Jan. 4, 2007

(30) Foreign Application Priority Data
Sep. 10, 2003  (GB) .................................. 0321239.6

(51) Int. Cl.
*H04L 12/26* (2006.01)
(52) U.S. Cl. ..................... 370/231; 370/233; 370/235; 370/232; 370/235.1; 709/234; 709/235; 709/233; 709/232; 709/231
(58) Field of Classification Search ................ 370/905; 713/176–178; 725/90, 93
See application file for complete search history.

(56) References Cited

U.S. PATENT DOCUMENTS

| | | | |
|---|---|---|---|
| 5,452,291 A * | 9/1995 | Eisenhandler et al. ........ | 370/402 |
| 5,761,343 A * | 6/1998 | Haruma et al. ............... | 382/236 |
| 5,778,175 A * | 7/1998 | Paul et al. .................... | 709/250 |
| 5,796,949 A * | 8/1998 | Ishida et al. ................. | 725/116 |
| 5,872,920 A * | 2/1999 | Hausman et al. ............. | 709/250 |
| 6,014,706 A * | 1/2000 | Cannon et al. ............... | 709/231 |

(Continued)

FOREIGN PATENT DOCUMENTS

EP       1271953       1/2003

(Continued)

OTHER PUBLICATIONS

Sarginson P.A. "MPEG-2: A Tutorial Introduction to the Systems Layer" IEE Colloquium on MPEG What it is and what it isn't IEE London, GB 1995, pp. 4-1.

*Primary Examiner*—Jason E Mattis
*Assistant Examiner*—Zewdu Beyen
(74) *Attorney, Agent, or Firm*—Lowe Hauptman Ham & Berner, LLP

(57) ABSTRACT

A network node apparatus is disclosed for the capture, storage and replay of video data at separate respective nodes of a communications network arranged to operably couple the node apparatus. The node apparatus may include a video capture node operable to capture video data and to transmit captured data via the communications network to a video storage node. The video storage node is arranged to store captured video data, and to transmit stored data via the communications network to a video replay node which renders an image therefrom. The video storage node transmits video data to the video replay node only if the content of a transmit buffer therein matches or exceeds a predetermined lower content value and the content of a receive buffer in the replay node does not exceed a predetermined upper content value.

25 Claims, 6 Drawing Sheets

U.S. PATENT DOCUMENTS

| | | |
|---|---|---|
| 6,211,869 B1 * | 4/2001 | Loveman et al. ............ 715/723 |
| 6,438,604 B1 * | 8/2002 | Kuver et al. ................ 709/234 |
| 6,715,007 B1 * | 3/2004 | Williams et al. .............. 710/52 |
| 2002/0004840 A1 | 1/2002 | Fujita et al. |
| 2002/0143973 A1 | 10/2002 | Price |
| 2002/0150049 A1 | 10/2002 | Abraham et al. |
| 2004/0031058 A1 * | 2/2004 | Reisman ..................... 725/112 |
| 2005/0036512 A1 * | 2/2005 | Loukianov .................. 370/469 |

FOREIGN PATENT DOCUMENTS

| | | |
|---|---|---|
| WO | WO 00/35201 | 6/2000 |
| WO | WO 02/45372 | 6/2002 |

* cited by examiner

VIDEO SYSTEM

CROSS REFERENCES TO RELATED APPLICATIONS

The present Application is based on International Application No. PCT/EP2004/051857, filed on Aug. 20, 2004, which in turn corresponds to GB 03/21239.6 filed on Sep. 10, 2003, and priority is hereby claimed under 35 USC § 119 based on these applications. Each of these applications are hereby incorporated by reference in their entirety into the present application.

FIELD OF THE INVENTION

The present invention relates to apparatus for use in the transmission of video data using a communications network, and to a communications network including such apparatus.

SUMMARY OF THE INVENTION

Computer networking permits remote retrieval by a given network computer of video data stored in a separate other computer of the same or another network, or stored in a video storage means access to which is controlled by a separate other network computer. In particular, transmission of video data across a computer network or Internet for immediate rendering/playback at a receiving computer is possible. In such situations, the receiving computer serves merely to receive video data and to substantially immediately render/play such received video data without storing the whole of, or any substantial part of, the retrieved video data before rendering.

However, the transmission of video data cross computer networks for immediate rendering at a destination computer must take due account not only of the transmission characteristics of the network across which the data is transmitted but also the methods by which received video data is rendered at the destination computer.

For example, the network may support high data transmission rates, yet the destination computer may only be compatible with lower data transmission rates comparable to the video frame rate of the video images to be rendered thereby. Accordingly, immediate video rendering at a destination computer typically requires a network communications system in which the node sending video data must closely co-ordinate with the node receiving that video data to ensure that video data is received at a rate most suited to the video renderer at the receiving node. Synchronous communications networking is typically employed to this end. The disadvantage of this lies in the need for synchronising hardware/software to put effect to the desired synchronisation, and also often the reduction of data transmission rates to rates below those supportable by the network but which are suited to the video renderer.

The alternative is the so-called asynchronous network transmission method in which a sending node may transmit data to a receiver/destination node without warning, meaning that the receiver must be prepared to accept data at any time during which the sender node is able to send such data. Packet switching is commonly used to this end. This technique segments video data into packets and each such packet is transmitted via the network to a predetermined destination node. Separate packets of a given data stream may reach the same intended destination node via different routes and thus may experience differing network transmission delays. The variability in packet transmission delays leads to video frame jitter at the video renderer of the destination node as video data packets are received at an irregular rate leading to irregular (i.e. "jittery") rendering of video frames. To combat frame jitter, data transmission across a network is typically performed at a rate much lower than the rates sustainable by the network itself. This permits easy regulation of the rate of transmission across the network—either through increases or decreases therein—so as to enable transmission of video data at rates which allow the renderer at the receiving node to render video frames at fixed intervals thereby providing smooth video motion pictures irrespective of the quantity of data required to be transmitted across the network for a given frame (this being a variable quantity).

To regulate the flow of video data across a network in this way requires regular and complex exchanges of control signals between the sending node and the receiving node. These control signals control the adjustment of data transmission rates from the sending node to the receiving node and are typically generated by dedicated software and/or hardware.

Thus, both synchronous and asynchronous network transmission systems currently require means dedicated to the regular interchange of transmission control signals between a data sending node and a data receiving node. This is due in particular to the special requirements of immediate video rendering across a computer network. Furthermore, these transmission control methods typically result in data transmission rates which fall below data rates supportable by a typical communications network interconnecting the transmitting and receiving nodes in question.

The present invention aims to address at least some of the aforementioned deficiencies in the prior art.

At its most general, the present invention proposes the asynchronous transmission of video data across a communications network from a sending node to a receiving node whenever the receiving node is able to receive such data. This may be achieved by providing intermediate retention/buffering of video data received at the receiving node from the sending node prior to subsequent storage of the received data or rendering/playing of video images using the received data depending upon the function of the receiving node (i.e. storage function or rendering function). This effectively obviates the need to match the data transmission characteristics of the communications network to the video storage or rendering characteristics of the receiving node. Consequently, the network may be employed at its optimum data transmission rate while the storage or rendering of video images at the receiving node may take place at any suitable rate e.g. at a frame rendering rate substantially free of frame jitter or a forced reduction in frame rates or data transmission rates.

Typical network transmission means often support data transmission rates which are higher than the rate at which video rendering means typically demand video data for use in rendering images or higher than a storage node is typically able to complete the storage of received video data. This means that according to the present invention one may keep a receiver node fully supplied/fed with video data during the entirety of the rendering of, or storage of, the video sequence in question. The higher rate of data transmission from the sending node ensures that supply of video data exceeds the demand thereof by the renderer, or storage means, and effectively keeps the intermediate buffer of the receiver node "topped-up", only running dry when the video sequence in question comes to its end.

It is to be understood that "video" or "video data" herein refers not only to video image data but also to video sound data (i.e. audio-visual data).

The invention may also provide the intermediate retention/buffering of video data selected from a transmitting node immediately prior to its transmission across the network to the receiving node. This obviates the need to match the video data retrieval/supply rates, in the transmitting node, to either the data transmission rate of the network or the rates at which data is demanded by the video renderer, or storage means, of the receiving node. Indeed, since data retrieval rates are not directly dictated by data demand rates at the receiver node, one may interrupt data transmission by e.g. momentarily disconnecting the receiver node from the network without effecting the retrieval of video data or the rendering of retrieved video data provided that reconnection occurs before the buffer of the receiver node empties or the buffer of the transmitting node overflows.

This permits greater efficiency and versatility in not only how one uses such networks, but also in the performance characteristics of the network node apparatus employed. That is to say, since the characteristics (e.g. achievable frame rates) of network nodal apparatus need not be directly tailored to the transmission characteristics of the network communications apparatus, such networks become more versatile and adaptable and permit a wider range of network nodal apparatus to be employed, including those which might otherwise have been deemed unsuitable in the absence of the aforesaid buffering at network node apparatus. Similarly since the network communications apparatus may operate optimally, this means that shorter periods are needed for video data transmission. Greater data transmission efficiency is achieved by freeing the network communications apparatus for other uses in between periods of non-transmission of video data.

In a first of its aspects the present invention may provide a network node apparatus for the storage and replay of video data at separate respective nodes of a communications network means arranged to operably couple the node apparatus wherein the node apparatus includes:
- a video storage node arranged to store video data, and to transmit stored data via the communications network means;
- a video replay node arranged to receive via the communications network means video data transmitted by the video storage node, and to render an image (e.g. an image alone, or an image with sound) therefrom;
- wherein the video storage node has transmit buffer means for temporarily retaining stored video data, and the video replay node has a receive buffer means for temporarily retaining the video data received thereby, the video storage node being operable to transmit video data to the video replay node only if (e.g. while) the content of the transmit buffer means matches or exceeds a pre-determined lower content value and the content of the receive buffer means does not exceed a predetermined upper content value.

Thus, provided that the transmitter of the video storage node has sufficient content and the receive buffer of the video replay node does not have excessive content, the video storage node may transmit video data without warning to the video replay node which will be able to accept data so transmitted. This is an asynchronous transmission method. For example, the video storage node may be arranged to transmit video data to the video replay node continuously, periodically or intermittently unless either the content of the transmit buffer means is below a predetermined lower content value or the content of the receive buffer means is above a predetermined content value, whichever occurs first. The video storage node may comprise a computer, such as a personal computer, containing (or controlling access to) video data storage means. Video data storage means may be the internal storage means of one or more computers, such as one or more computer hard drives (e.g. arranged in a RAID formation to permit multi-streaming of data), or may be external dedicated storage means such as a database.

A RAID (Redundant Array of Inexpensive Disks) is a method of combining multiple hard drives for making a larger, faster data access and storage system as is well known in the art. A RAID formation splits the stored data between a plurality of disk drives in parallel. This permits parallel access to multiple drives and, thus, multi-streaming of data whereby a plurality of video replay nodes or video capture nodes may access the RAID storage system in the video storage node simultaneously and independently. Disk redundancy is also permitted whereby, in case one disk drive fails, the remaining disk drives may continue to function in place of the failed disk drive. Data storage in the database may be in either in analogue or digital form such as computer hard drives (e.g. in RAID configuration) or may be upon magnetic tape or in digital video disks or the like. For example the video storage node may comprise a server means containing computer means, and a suitable video storage data base such as described hereinbefore, the server means being operable to control the access to and retrieval of video data stored within the video database. Similarly, the video reply node may comprise a computer, such as a personal computer, arranged to render video images either via the visual display unit (VDU) thereof or via an alternative means of visual display controlled by the computer (e.g. the projection apparatus of an image projection system). The video replay node may render video images (and sound) using a projector mounted upon the helmet of a pilot within an aircraft simulator apparatus, it may render a simulated image within/as a Head Up Display (HUD) within a vehicle simulator. The rendering may employ a television, of high definition or otherwise, or may employ the use of video walls.

In the network node apparatus, the video storage node is preferably arranged to transmit data temporarily retained in the transmit buffer thereof at the maximum data transmission rate supported by the communications network means.

Such data transmission may take the form of a continuous transmission of data, or may take the form of the intermittent or periodic transmission of blocks, portions or segments of video data with each such block, segment or portion being transmitted at the maximum data transmission rate supported by the communications network means in question. The communication network means may comprise an Ethernet communications network forming a Local Area Network (LAN) or a Wide Area Network (WAN). For example, the communications network means may be (or include) a 100 Mbit/sec or a gigabit/sec Ethernet. Consequently, in such cases, the rate of data transmission from the video storage node may be 100 Mbit/set or 1 Gbit/sec respectively.

The network node apparatus may also include apparatus for capturing video data (e.g. image data or image and sound data) at a node separate from the video storage node and the video replay node, and for communicating the captured data to the video storage node for storage thereat. The "capturing" of video data includes the generation of video data, or the receipt of existing video data from a video data source which is external to the network to which the network node apparatus is adapted. For example, the capturing of video data may comprise the capture of video data generated by a video imaging device (and a sound recording device where appropriate) such as a video camera or a simulator means for generating simulated images, or may comprise the receipt of pre-existing video data generated independently of the network node apparatus.

Thus, in addition to the video storage node and the video replay node, the network may also include a video capture node for capturing video data representing an image (with sound data where appropriate), and arranged to transmit such video data via the communications network means to the video storage node, wherein the video storage node is arranged to receive the video data transmitted from the video capture node for the said storage thereof.

Thus, it will be appreciated that resources required for the capture, storage and replay of video data may be distributed across three respective nodes of a communications network. This spreads the computational load of the system across the network nodes in question such that none are required to provide the functionality provided by any of the other of the three nodes. However, it is, of course, possible that any one of the video capture node, the video storage node, and the video replay node may also provide the functionality provided by any one of (or both of) the other of the aforementioned three nodes.

Preferably the video capture node has a transmit buffer means for temporarily retaining the captured video data and the video storage node preferably also has a receive buffer means for temporarily retaining video data received thereby, the video capture node preferably being operable to transmit video data to the video storage node only if (e.g. while) the content of the transmit buffer means thereof matches or exceeds a predetermined lower content level and the content of the receive buffer means of the video storage node does not exceed a predetermined upper content level.

Consequently, the video capture node may receive or generate video data at a rate which differs from both the chosen rate of data transmission across the communication network means and the rate at which the video storage node accepts video data for storage thereby. The transmission of video data from the video capture node in this way may be continuous, periodic or intermittent. When periodic or intermittent, the data transmitted may take the form of segments or packets of video data. The video capture node may be operable to transmit video data to the video storage node unless either the content of the transmit buffer of the video capture node is below the predetermined lower content value or the content of the received buffer of the video storage node is above a predetermined upper content value, whichever occurs first.

The video capture node is preferably arranged to transmit data temporarily retained in the transmit buffer thereof at the maximum data transmission rate supported by the communications network means.

Of course, other transmission rates which are less than the maximum rate supported by the network communications means may be employed, however, it is highly preferable that the rate of data transmission employed by the video capture node is sufficiently high to ensure that the received buffer of the video storage node does not empty before the end of the video sequence to be stored. Furthermore, it is also preferable that the rate of data transmission from the video capture node exceeds the rate of demand of such data at the video storage node thereby obviating the need to constantly transmit video data from the former to the latter and permitting data transmission in the form of shorter bursts of high data-rate as opposed to longer bursts of lower data-rate.

The predetermined upper content value may correspond to the content of the respective receive buffer when full for example.

Thus, transmission of video data from the video capture node to the video storage node preferably only occurs when the receiving node has room to receive transmitted data and when the transmitting node has video data to transmit. If this condition is not satisfied then transmission from the video capture node to the video storage node is preferably prevented until both the transmit buffer of the video capture node contains image data to send and the received buffer of the video storage node has room to receive such video data. The predetermined lower content value may correspond to the content of the respective transmit buffer when empty. Of course, the predetermined upper and lower content levels may be other than full and empty respectively.

Preferably, each of the receive and transmit buffers of the video storage node, the video reply node, and, if included, the video capture node is arranged to have capacity to store at least one frame of video (e.g. with sound) data. The upper limit placed upon the storage capacity of such buffers is limited merely by the availability of memory within the respective network node apparatus of which the buffer(s) forms a part.

In the network node apparatus the video replay node may include transmission control means arranged to detect when the content value of the receive buffer thereof matches or exceeds the predetermined upper content value and to communicate such detection via the network to the video storage node as a first detection signal.

The video storage node preferably also includes transmission control means arranged to receive first detection signals from the video replay node, to generate a second detection signal when the content value of the transmit buffer thereof does not exceed the predetermined lower content value, and to prevent video data transmission from the video storage node to the video replay node either in response to (e.g. upon or after) receipt of the first detection signal or in response to (e.g. upon or after) generation of the second detection signal.

Where the network node apparatus includes the video capture node, the video storage node may include transmission control means arranged to detect when the content value of the receive buffer thereof matches or exceeds the predetermined upper content value and to communicate such detection via the network to the video capture node as a first detection signal.

Preferably, the video capture node includes transmission control means arranged to receive first detection signal from the video storage node, to generate a second detection signal when the content value of the transmit buffer thereof does not exceed the predetermined lower content value, and to prevent video data transmission from the video capture node to the video storage node either in response to (e.g. upon or after) receipt of the first detection signal or in response to (e.g. upon or after) generation of the second detection signal.

The above content level is most preferably a predetermined value corresponding to the content of the respective receive buffer when intermediate full and empty. The predetermined value most preferably corresponds to the content of the receive buffer when a predetermined portion of buffer capacity remains unoccupied wherein the predetermined proportion is sufficient to contain video data transmitted thereto by a transmit buffer during the time interval between communication of the first detection signal to the transmit buffer and subsequent prevention of transmission of video data by the transmit buffer in response to the first detection signal.

The predetermined upper content level of a given receive buffer means is preferably represented by a watermark stored within the buffer means. The upper content level is preferably determined in accordance firstly with the rate at which the network node of which the buffer forms a part depletes/empties the buffer in question, and secondly with the rate at which the network node from which the buffer receives video data is able to replenish the buffer in question with video data, such that the receive buffer has capacity to receive video data transmitted by the transmit buffer after communication by the receive buffer of the first detection signal and before subsequent prevention of video data transmission by the node to which the first detection signal was communicated. Overflow of the receiver buffer is thereby prevented.

Preferably the transmission control means of either (or each) of video capture node and video storage node is operable to prevent video data transmission therefrom to the video storage or video replay node respectively, in response to receipt of a first detection signal after completion of the transmission of video data corresponding to a whole video frame if transmission of such data commenced before receipt of the first detection signal. This prevents incomplete transmission of video frames. The predetermined unoccupied proportion of a receive buffer may be equal to twice the product of: the rate of video data transmission across the network; and, the duration of a whole video frame at the video renderer of the video replay node.

The network node apparatus preferably has a video replay node which includes video replay selection means for selecting the replay rate of video images to be rendered thereby and for transmitting said selection to the video storage node via the communications network. The video storage node preferably also includes time-stamp control means for applying a time-stamp to video data stored therein according to the selected video replay rate, such that video images rendered by the video replay node using video data with the said time-stamp are rendered at the selected video replay rate.

The video replay selection means is preferably operable to select, in respect of video data corresponding to a given sequence of video frames, an n-fold (n=integer) increase in the video replay rate of the given sequence to be rendered at the video replay node. In response to such selection, the video storage node is most preferably operable to apply a time-stamp to only that video data stored therein which corresponds to the first frame of the given sequence of video frames to be rendered, and to those subsequent frames within the given sequence which succeeds the first frame by successive integer multiples of n frames. Only the video data (frames) possessing such a time-stamp are transmitted from the video storage node to the video replay node to be rendered. The time-stamp applied to such video data (frames) most preferably causes the video data so stamped to be rendered at a constant frame rate which is independent of the value of n. Thus, while the rate at which video frames are rendered by the video renderer may remain constant irrespective of the value of n, an increase in replay rate may be achieved by progressing through a given sequence of video frames simply disregarding portions of that sequence.

More generally, the time-stamp control means is preferably operable to generate a plurality of separate time-stamps forming a temporal sequence of time-stamps for application to video data representing a plurality of separate video frames forming a temporal sequence of video frames, and to apply time-stamps selected from the sequence of time-stamps to video data representing video frames selected from the sequence of video frames wherein: the selected time-stamps are sequentially consecutive (i.e. neighbours in the temporal sequence) and the respective selected video frames are sequentially non-consecutive; or, the selected video frames are sequentially consecutive and the selected time-stamps are sequentially non-consecutive; or, the selected time-stamps are sequentially non-consecutive and the respective selected video frames are sequentially non-consecutive.

This permits either an increase or decrease in video replay rates at the video replay node using the time-stamped video frames. Consecutive time-stamps are preferably consecutive integer multiples of a single fixed video frame period (e.g. 33.33 ms) and so indicate to the video replay node the time at which the rendering of the given frame within a sequence of video frames is to begin. For example, an n-fold increase in the video replay rate at the video replay node, in response to an appropriate selection via the replay selection means, is facilitated by applying sequentially consecutive time-stamps only to those respective non-consecutive video frames separated from each other by n−1 intermediate video frames within the sequence of video frames.

Similarly, an n-fold decrease in video replay rates may be facilitated by applying to sequentially consecutive video frames within the sequence of video frame only those respective non-consecutive time-stamps separated from each other by n−1 intermediate time-stamps within the sequence of time-stamps.

Alternatively, the time-stamp control means may be operable to apply sequentially non-consecutive time-stamps only to respective non-consecutive video frames wherein both the time-stamps and the respective video frames in question are separated from each other by n intermediate time-stamps or video frames, respectively within the sequence of time-stamps or of video frames. The result is an n-fold decimation of the rendered video data thus reducing the amount of data and bandwidth required to transmit video data to the video replay node so as to render the video data at normal replay rates (e.g. the rate at which video frames were originally captured).

The video replay node and video storage node preferably include data flow control means operable to control the rate of transmission therebetween of frames of a sequence of video frames by controlling the video storage node to transmit only selected frames distributed within the sequence, being fewer in number than the total number of frames within the sequence.

Selection of the distributed frames may occur by a decimation process in which only those frames separated from the first frame by an integer multiple of N (N=integer) frames are selected. Alternatively, decimation may result in all but those frames separated from the first frame by an integer multiple of N frames being so selected. The data flow control means is preferably operable to control the rate of transmission of a given sequence of video frames from the video storage to the video replay node according to: the rate at which frames of the sequence were recorded/captured; the rate at which the frames are to be rendered at the video replay node; and, the content/capacity of the receive buffer means of the video replay node to which the video frames are to be transmitted thereby to control the content/capacity of the receive buffer means.

Preferably, the data flow control means is operable to gather at the video replay node the contemporaneous rate of frame rendering thereat and content of the buffer means thereof, to transmit the gathered information to the video storage node, and to reduce or increase the portion of frames to be selected at the video storage node from within a sequence of video frames (e.g. by decimation) to be transmitted to the video replay node according to the gathered information.

Preferably the data flow control means at the video storage node is operable to periodically increase the proportion of frames to be selected from a sequence of frames to be transmitted to the video replay node (e.g. by periodically reducing the frame decimation rate) until the content value of the receive buffer of the video reply node exceeds a given content value. Most preferably data flow control means at the video replay node is operable to gather and transmit the aforesaid contemporaneous data when the content value of the receive buffer of the replay node exceeds a given content value, the data flow control means of the video storage node being responsive to receipt of such gathered information so as to reduce to a preset value the proportion of the frames (e.g. increase frame decimation) to be transmitted to the replay node. Preferably, the aforesaid periodic increase in the proportion of frames so selected is resumed by the data flow control means subsequent to the aforesaid reduction therein.

In this way, the data flow rate across the network may be periodically updated to cause the content level of the receive buffer means of the replay node to hover/fluctuate around a suitable given value.

The data flow means at the video storage means may be alternatively or additionally operable to control the rate of transmission of the frames of a sequence of frames to the video replay node according to the content/capacity of the transmit buffer of the video storage node. For example, the data flow control means may increase the proportion of video frames selected for transmission from the storage node (e.g. reducing decimation) if the content of the transmit buffer thereof falls below a preset lower content level, or to reduce that proportion (e.g. increase frame decimation) should the content of the transmit buffer thereof exceed a preset upper content level.

The data flow control means may be operable to double the frame decimation rate of a frame sequence to be transmitted from the storage node should the transmit buffer thereof become full. Most preferably, the data flow control means is operable to control the time-stamp means to implement any/all of the aforementioned n-fold frame decimation steps by applying sequentially non-consecutive time-stamps only to respective non-consecutive video frames wherein both the time-stamp and the respective video frames in question are separated from each other by n intermediate time-stamps or video frames, respectively, within the aforesaid sequence of time-stamps and video frames.

In preferred embodiments of the invention, the network node apparatus further comprises the communications network means, in addition to the network nodes arranged to be operably coupled thereby, the communications network means being arranged to provide a communication link coupling each nodal apparatus to each other nodal apparatus, in use.

Indeed, the present invention in preferred embodiments, further comprises the communications network means connected to the network nodes such that it operably couples the video storage node to the video replay node thereby placing the video storage node in asynchronous communication with the video replay node. This applies to embodiments containing the video storage and video replay nodes, and also containing the video capture node.

It is to be understood that the term "video" used herein is to be construed as referring to video image data lone and to the combination of video image data and sound data associated therewith (i.e. audio-visual data).

It is also to be understood that the invention in its first aspect provides apparatus for the implementation of a method for the storage and replay of video data at separate respective nodes of communications network, and the invention in further aspects includes such a method including some, none or all of the preferred embodiments or alternative features discussed above in respect of the invention in its first aspect.

Accordingly, in a second of its aspects, the present invention may provide a method for the storage and replay of video data at separate respective nodes of a communications network means arranged to operably couple the nodes wherein the method includes:
  storing video data at a video storage node;
  temporarily retaining the stored video data in a transmit buffer of the video storage node; and subsequently;
  transmitting the retained video data via the communications network means;
  receiving at a video replay node the video data transmitted by the video storage node;
  temporarily retaining the received video data in a receive buffer means of the video replay node; and subsequently;
  rendering an image (e.g. an image alone, or an image with sound) at the video replay node using the received video data;
  wherein said transmission of video data from the video storage node to the video replay node occurs only if (e.g. while) the content of the transmit buffer means matches or exceeds a predetermined lower content value and the content of the receive buffer means does not exceed a predetermined upper content value.

Preferably, the transmission of retained data from the storage node occurs at the maximum data transmission rate supported by the communications network means.

This method may further include capturing at a video capture node video data representing an image (and possibly sound data also), transmitting captured video data via the communications network means to the video storage means, receiving at the video storage node the captured video data transmitted from the video capture node for the said storage thereof.

When the method includes such video data capture, the method preferably also includes temporarily retaining captured video data in a transmit buffer means of the video capture node, transmitting the retained video data via the communications network, receiving at the video storage node the data transmitted by the video capture node, temporarily retaining the received data in a receive buffer means of the video storage node, wherein the transmission of video data from the video capture node to the video storage node occurs only if (e.g. while) the content of transmit buffer means thereof matches or exceeds a predetermined lower content level and the content of the receive buffer means of the video storage node does not exceed a predetermined upper content level.

The transmission of the retained video data from the video capture node preferably occurs at the maximum data transmission rate supported by the communications network means.

The predetermined upper content value may correspond to the content of the receive buffer when full, and the predetermined lower content value may correspond to the content of the transmit buffer when empty.

The method may also include:
  detecting at the video replay node when the content value of the receive buffer thereof matches or exceeds the predetermined upper content value, and communicating such detection via the network to the video storage node as a first detection signal.

Accordingly, the method may further include receiving at the video storage node a first detection signal from the video replay node, generating a second detection signal when the content value of the transmit buffer thereof does not exceed the predetermined lower content value, and preventing video data transmission from the video storage node in response to (e.g. upon or after) upon receipt of the first detection signal or in response to (e.g. upon or after) generation of the second detection signal.

Similarly, when the method includes the aforesaid step of video data capture, the method may also include detecting at the video storage node when the content value of the receive buffer thereof matches or exceeds the predetermined upper content value, and communicating such detection via the network to the video capture node as a first detection signal.

Once more, in such cases, the method may yet further include receiving at the video capture node a first detection signal from the video storage node, generating a second detection signal when the content value of the transmit buffer thereof does not exceed the predetermined lower content value, and preventing video data transmission from the video capture node in response to (e.g. upon or after) upon receipt of the first detection signal or in response to (e.g. upon or after) generation of the second detection signal.

The method may include selecting at the video replay node the replay rate of video images (and sound where appropriate) to be rendered thereby, communicating that selection to the video storage node via the communications network, and applying a time-stamp to video data stored in the video storage node according to the said selection, such that video images rendered by the video replay node using video data with the said time-stamp are rendered at the selected video replay rate.

The method may include asynchronously communicating between said nodes of the communications network using the communications network.

In a third of its aspects, the present invention may provide a computer program and/or a computer program product/carrier (e.g. disc, tape, chip) including computer code for implementing a method according to the invention in its second aspect including some, none or all of the aforementioned preferable features or variants thereof.

Furthermore, in its third aspect, the present invention may provide a computer network (or computers of nodal network apparatus) programmed according to the invention in its third aspect.

A computer network may be provided including a plurality of separate network nodes each of which includes a computer programmed to implement the method, according to the invention in its third aspect, collectively with a computer of one or more other of said plurality of network nodes.

The network node apparatus according to the first aspect of the invention may be provided in which each said node apparatus a computer, such as a personal computer, separate from each of the other said node apparatus.

BRIEF DESCRIPTION OF THE DRAWINGS

Non-limiting examples of the invention shall now be described with reference to the accompanying drawings in which.

DETAILED DESCRIPTION OF THE INVENTION

In the figures like functional or technical features have been assigned common reference signs for consistency.

Figure 1:
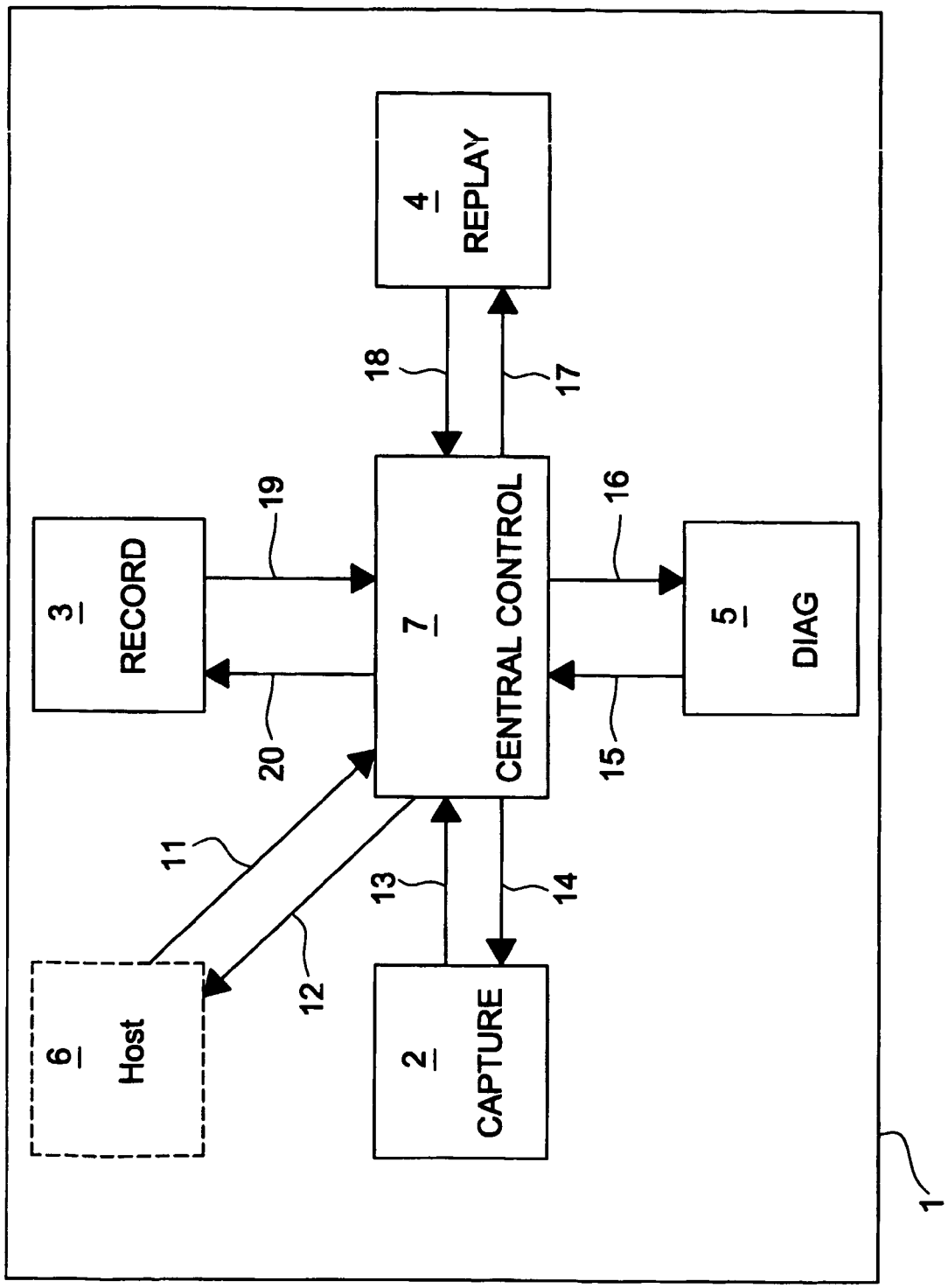
FIG. 1 schematically illustrates software applications to be implemented in the components of a computer network including a plurality of separate network nodes.

FIG. 1 schematically illustrates software applications to be implemented in network node apparatus of a computer network (1) for implementation of an embodiment of the present invention.

Each application may be implemented upon a separate network node apparatus (e.g. a node computer) and several of the applications may be implemented upon the same network node apparatus (e.g. node computer).

The software applications include a video capture software application (2) which, when implemented upon a suitable video capture node apparatus, is arranged to control that node apparatus to capture video data representing an image at least, and possibly also image and sound data. The software applications also include a video data storage software application (3) and a video replay software application (4) which, when implemented upon suitable video storage and video replay node apparatus respectively, are arranged to control the respective node apparatus to store received video data and to render video images (and sound if applicable) from received video data respectively.

The video capture application (2), the video storage application (3) and the video replay application (4) are arranged to be controlled via a central network control application (7) when the latter is implemented upon suitable network node apparatus (e.g. a node computer). Each software application, when implemented upon a given network node apparatus of the network (1), communicates with other software applications using a network communications apparatus (e.g. and Ethernet) not shown in FIG. 1. The network communications apparatus also places a host computer (6) in communication with the central network control software application (7). The host computer serves as a means by which a user may control the operation of the video capture, video storage and video replay applications remotely via the central network control application, and contains a host software application enabling the generation of control command signals (11) compatible with the central network control application (7) from user command signals input at the host computer, and enabling the generation at the host computer (6) of signals compatible with the host computer system and the user thereof from signals (12) sent to the host computer from the central network control application.

A network diagnosis software application (5) is provided for detecting and diagnosing, when implemented on suitable network node apparatus (e.g. a computer), faults occurring within the implementation of any of the software applications aforementioned. This application is also arranged to communicate with, and be controlled by, the central network control application (7).

The network diagnosis software application provides one, some or all of the following facilities:

(a) real-time checks that each of the software applications of the network node apparatus is alive (i.e. operational). This is achieved by transmission of a predetermined test message to which the recipients software application is operable to respond with a predetermined return message (e.g. a "ping" mechanism). Absence of such a return message subsequent to transmission of a test message indicates the recipient application is not operational;
(b) direct monitoring of the communications to the central control software application;
(c) off-line execution of tests (e.g. using simulated command signals) of the functionality of software applications. The response of the software application being test may be recorded. Complicated sequences of test command signals running over many test patterns may be executed;
(d) provision of diagnostic information back to the host software application.

Each aforesaid network software application may be implemented upon a separate network node apparatus, or several such software applications may be implemented on the same network node apparatus. For example, the video capture software application may be implemented at the same network node and using the same node apparatus (or at least different suitable parts of the same overall node apparatus) as the video storage application, as may the video replay application. Similarly, the network diagnosis software application and the central network control application may be implemented at the same network node using the same overall node apparatus.

In use, the central network control software application (7) receives user commands (11) from the host computer (6). Upon determining the nature of the commands, the central network control application passes the commands to those nodes of the network where the relevant software application is located. Thus, user commands (14) relevant to the video capture application (2) are passed to the node assigned to implement that application. Commands (20) relevant to the video storage application are passed to the node assigned to implement that application, and commands (17) relevant to the video replay application are passed to the node assigned to implement video image and sound rendering.

Upon receipt of a user command (14) for the capture of video image and/sound data, the video capture application implements image (and sound if needed) capture by suitably operating the video capture node apparatus. The resultant video (e.g. audio visual) data (13) captured thereby is subsequently passed to the central network control application and thence to the video storage application (signal 20) for storage at the video storage node apparatus. Similarly, upon receipt by the central network control apparatus of a user command (11) for the replay/rendering of video images or sound at the video replay node apparatus, the network control application implements centralised control of both the video storage application and the video replay application—which are typically located at separate respective nodes of the network. A retrieval command (20) is passed from the network control application to the video storage application to initiate retrieval of stored video data thereat, and to transmit retrieved video data (19) via the network communications apparatus back to the central network control application and thence (signal 17) to the video replay application for rendering thereby. Communication of transmission control signals (18) from the video rendering application are passed (20) to the video storage application via the network control application.

The network diagnostics application communicates with the other network applications via the input (16) and output (15) or signals to the central network control apparatus through which all control signals, and the results thereof, are passed. Similarly, any or all diagnostics signals (15) from the network diagnostics application, and any or all of the results of user command signals and transmission control signals may be passed (signal 12) back to the host application (6) for review by the user. All communication between node applications located at separate network node apparatus is done via the network communications apparatus. For example, where each of the node applications illustrated in FIG. 1 is located at a separate respective network node, then the means of communication between any one application and any other application is the network communications apparatus. Thus, signals (11) to (20) each pass between network nodes using the network communications apparatus in such a case.

The video capture node apparatus may comprise a video camera for generating contemporaneous video image and sound data, either digital or analogue in format, or may comprise means for generating image data representing a simulated image or representing a display image to be displayed upon any form of display means (e.g. a radar screen, a cockpit display image etc). The video capture node may receive such video image date (and associated sound data where appropriate) generated externally of the network (1).

The video storage node apparatus may comprise a computer system (e.g. one or more personal computers), possessing a read/write memory store such as a computer hard drive or a set of such hard drives configured in a RAID arrangement to permit good multi-streaming of data. Alternatively, or additionally, a computer apparatus connected to, and arranged to control access to, a dedicated video data store/data base such as an array of video recording devices (e.g. DVD or video cassette machines etc) of either digital or analogue recording format may be used. Digital to analogue conversion means (e.g. software) may be employed where analogue storage formats are employed so as to enable the stored analogue data to be digitised prior to network transmission thereof, and to enable captured video data received via the network in digital format to be made analogue in format for storage.

The video replay node apparatus may comprise any suitable means for receiving digital video data and for rendering video images (and sound where appropriate) therefrom. The apparatus may comprise a computer means, such as a personal computer, for receiving digital image data from the network communications means and for presenting the video images (and sound where appropriate) rendered from received data upon a visual display means controlled by that computer. Examples of suitable visual display means are:

the visual display unit (VDU) of a PC;
a TV monitor controlled by the computer means of a node;
image projection apparatus controlled by the computer of the node. Other examples, such as would be readily apparent to the skilled person, may also be employed.

The central network control application may run on a standard Windows 2000 PC. However, Windows XP or derivatives thereof may be used, indeed any suitable software such as would be readily apparent to the skilled person may be employed. This can be run on any of the machines that are networked as part of the network node apparatus. Usually it is run on the machine acting as the server, as it has best network response, but this is not essential. The network diagnostic application may also be run on any Windows 2000 (or other) PC.

The network communications apparatus may be any suitable apparatus such as would be readily apparent to the skilled person. The apparatus may be of a bus, star or ring topology being either wire-based or wireless-based (or a mixture of both). The network communications apparatus may provide a local area network (LAN) or a wide area network (WAN) and may be an internet comprising several or many interconnected local or wide area networks.

Figure 2:
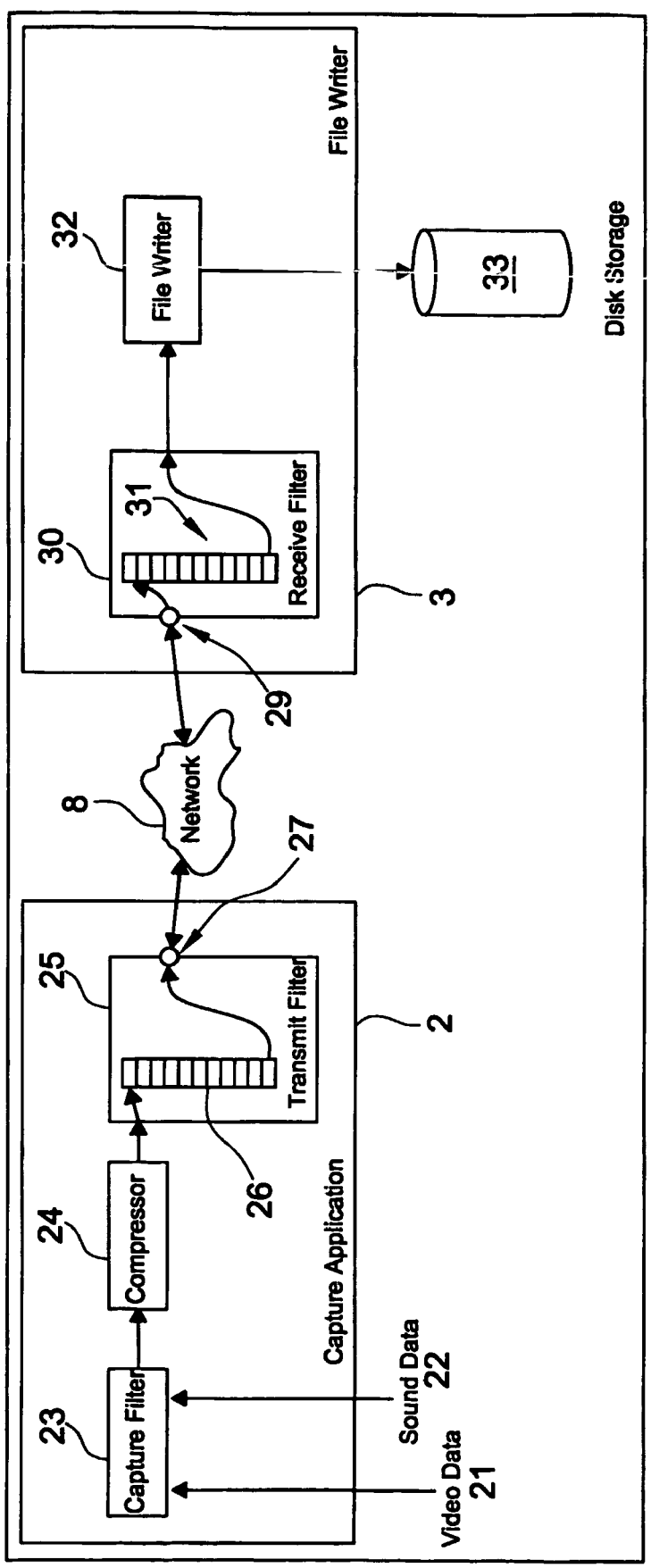
FIG. 2 schematically illustrates functions of an video capture node and of a video storage node, the former being in communication with the latter via a computer network communication link.

FIG. 2 Schematically illustrates the implementation of the video capture application (2) and the video storage aspect of the video storage application (3) in respect of captured video data (i.e. audio visual image data in this case).

Video image data (21) and associated video sound data (22) are captured by a data capture filter software application (23) from any number of a selected number of data capture channels available to the video capture node. Selection of data capture channels is made by the user at the host computer (6) and the selection is communicated to the video capture node via the network communications apparatus (8) and the central network control application (7). Selection of a given data channel may instigate generation of contemporaneous digital video data at the video capture node (e.g. cause a video camera to operate) or may simply permit existing digital video data to be input to the capture filter (23). The selected video data is passed from the capture filter to a compression software application which compresses the received video data (image and sound) according to any suitable data compression algorithm such as would be readily apparent to the skilled person. Compressed audio-visual data is subsequently passed to a transmit filter software application (25) containing a transmit buffer software application (26) which temporarily retains, on a frame-by-frame basis, audio-visual data received thereby. The transmit buffer application provides a FIFO (first-in-first-out) buffer function thereby forming a queue of buffered video frames (image frames and associated sound frame data) each awaiting its turn to be transmitted from the video capture node (2) by the transmit filter application via a network socket connection (27) connecting the video capture node to the network communications apparatus (8).

Video frames are transmitted by the transmit filter (25) of the video capture node, using an IP (Internet Protocol) transmission protocol, addressed to the video storage node (3) of the network. Video frames are received by the video storage node at a network socket connection (29) thereof whereupon the received frames are passed to a receive filter software application (30).

The receive filter application contains a receive buffer software application (31) which temporarily retains, on a frame-by-frame basis, the audio visual frame data received thereby. The receive buffer application provides a FIFO buffer function thereby forming a queue of buffered audio visual data frames each awaiting its turn to be stored by the video storage node. A file writer software application (32) controls the physical storage of audio visual video data temporarily retained in the receive buffer by reading a new frame of video data from that buffer only when the video storage apparatus (33) of the video storage node is ready to receive and save more video data—i.e. the file writer application (32) regulates the rate of demand of video data at the storage node (3) according to the rate of data storage sustainable by the video storage apparatus (33). This storage apparatus is, in this example, a computer disc storage apparatus such as a hard drive or set of hard drives arranged as a RAID (alternatively, a read-write DVD database may be used).

Video storage application (3) includes a transmission control software application arranged to detect when the content value of the receive buffer application (31) exceeds a predetermined upper content value (e.g. when the buffer becomes completely full), and to communicate this fact to the video capture application (2) via the network (8). Similarly the video capture application (2) includes a transmission control software application arranged to receive such transmission control signals from the video storage node and also to detect when the content of the transmit buffer of the video capture node reaches a predetermined lower content value (e.g. when the transmit buffer becomes completely empty). The transmission control apparatus of the video capture node is further arranged to prevent further transmission of video data frames from the transmit filter (25) when either of the aforementioned buffer conditions arises. Accordingly, the receive filter application (30) of the video storage node communicates, via the network, with the transmit filter application (25) of the video capture node so as to ensure that the transmit filter transmits video frame data to video storage node only while the content of the transmit buffer exceeds a given lower content level and the receive buffer does not exceed a given upper content level. When transmission does occur, it occurs at the maximum data transmission rate supported by the communications network apparatus (8). Where this is an Ethernet network apparatus, such transmission may occur at data rates of up to about 1 Gigabit/sec.

Figure 3:
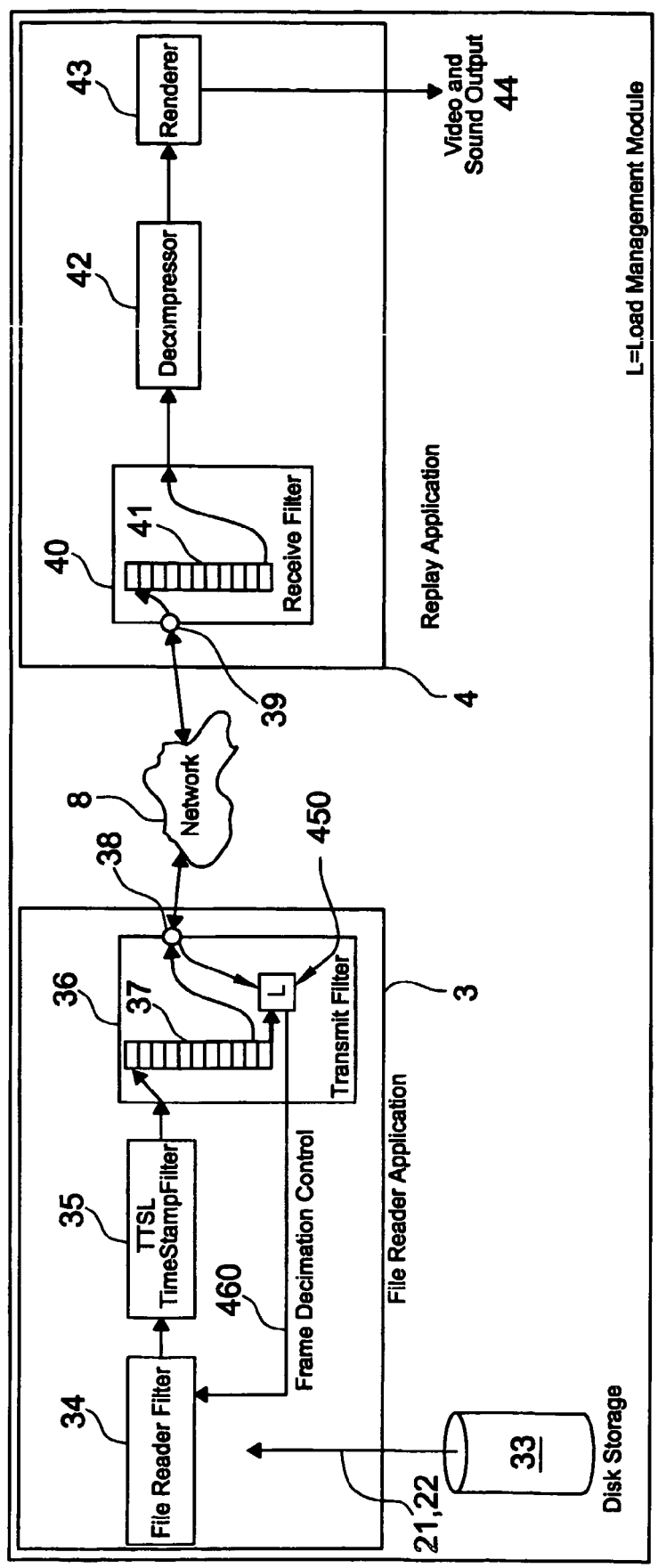
FIG. 3 illustrates functions of a video storage node and of a video replay node the former being in communication with the latter via a computer network communications link.

FIG. 3 schematically illustrates the implementation of the video replay application (4) and the video retrieval aspect of the video storage application (3) in respect of stored audio visual video data retrieved from storage at the video storage node.

User commands input at the host computer application (6) are received by a file reader application of the video storage node and are passed to a file reader filter (34). In response to the received user commands, the file reader filter software application retrieves from the video storage apparatus (33) audio visual video data selected by the user. The file reader filter application passes selected video data to a time-stamp filter software application (35) which applies an appropriate time-stamp to video data received thereby according to a selected video frame rate at which video frames are to be rendered at the video replay node. Time-stamped video data is passed from the time-stamp filter software application (35) to a transmit filter application (36) containing a transmit for software application (37) which temporarily retains, on a frame-by-frame basis, audio visual data received thereby. The transmit buffer application provides a FIFO buffer function thereby forming a queue of buffered video frames each awaiting its turn to be transmitted from the video storage node (3) by the transmit filter application from a network socket connection (38) connecting the video storage node to the network communications apparatus (8). Video frames are transmitted by the transmit filter (36) addressed to the video replay node (4) using an IP transmission protocol. These transmitted video frames are received at the video replay node (4) at a network socket connection (39) thereof, whereupon they pass to a receive filter software application (40). This receive filter application contains a receive buffer software application (41) which temporarily retains, on a frame-by-frame basis, audio visual data received thereby. The receive buffer application provides a FIFO buffer function thereby forming a queue of buffered video frames each awaiting its turn to be rendered at the video image (and sound) rendering means of the video replay node. Video frame data is taken from the receive buffer (41) of a video replay node only when the image/sound rendering apparatus of that node is ready to accept another frame from the buffer. When this condition arises, the video frame data at the head of the receive buffer is passed to a data decompressor software application (42) whereupon the compression applied at the data compression software application (24) of the video capture node (2) is reversed. Subsequent to decompression, a decompressed video data frame is passed to video rendering apparatus (43) whereupon a video image, and any associated video sound, is rendered as audio-visual output (44).

The transmit filter application (36) of the video storage node is arranged to transmit video data frames from the transmit buffer (37) thereof only while the content of that transmit buffer exceeds a predetermined lower content value (e.g. while the buffer is other than empty), and only while the content of the receive buffer (41) of the receive filter application (40) of the video replay node does not exceed a predetermined upper content value (e.g. it is not completely full). This is achieved by providing the video replay node with a transmission control stored application arranged to detect when the content value of the receive buffer (41) thereof exceeds the predetermined upper content value in question, and to communicate such detection via the network apparatus (8) to the video storage node. In conjunction with this the video storage node is provided with a transmission control software application arranged to receive such transmission control signals emanating from the video replay node, and to detect when the content value of the transmit buffer (37) of the video storage node does not exceed the aforementioned predetermined lower content value. The transmission control software application of the video storage node is further arranged to prevent video data transmission from the transmit filter (36) thereof when either of these two buffer content conditions occurs.

Transmission of video frame data, and of transmission control signals, between the video storage node and the video replay node occurs at the maximum data transmission rate supported by the network communication means (8).

The predetermined content value of the receive buffers of both the video storage node (31) and the video replay node (41) corresponds to the content of the respective buffer when a predetermined portion of the buffer capacity remains unused. This predetermined portion is sufficient to contain video data transmitted thereto by a transmit buffer (26 or 37) during the interval of time between communication of the first detection signal (from the given received buffer to the corresponding transmit buffer) and subsequent prevention of transmission of video data by the corresponding transmit buffer in response to the first detection signal. The transmit control means of either (or each) of the video capture node and the video storage node is operable to prevent video data transmission therefrom to the video storage or video replay node respectively, in response to receipt of a first detection signal after completion of the transmission of video data corresponding to a whole video frame if transmission of such data commenced before receipt of the first detection signal. This prevents incomplete transmission of video frames. The predetermined portion may be equal to twice the product of: the rate of video data transmission across the network; and, the duration of a whole video frame at the video renderer of the video replay node.

The determination of the upper content value is based on the rate of consumption (e.g. one frame in 33.3 ms) and the rate of transmission (e.g. 10 M bytes/sec), plus delays in preventing the transmission of video data from the transmit buffer.

e.g. 10 M*0.033=amount of data that can be transmitted in one frame=346K.

However as there could be a frame being transmitted when a first detection signal is received at the transmit node and one wishes to transmit all of that frame, then one requires that the upper content value equal 692K (i.e. twice 346K). To ensure good uninterrupted video rendering, buffers with a capacity to store video data corresponding to of 5 to 10 second of video rendering are generally used. Buffers of 4 M bytes to 10 M bytes in size are used with upper content values set at 1 M byte from the top (i.e. 1 M byte below full). This may be varied of course.

The video replay node software application includes a video replay selection software application arranged for selecting, when implemented, the video frame rate of video frames to be rendered by the rendering apparatus of the video replay node, and for transmitting that selection to the time-stamp filter application (35) of the video storage node via the network (8). Accordingly, the time-stamp filter application (35) at the video storage node is arranged to apply a time-stamp to video data frames passed to it by the file reader filter application (34) according to the selected video frame rate. The time-stamp applied to each video data frame in this way is selected by the time-stamp filter such that video images (and associated sound) rendered by the video replay node using video data frames containing such time-stamps are rendered at the selected video frame rate. For example, fast-forward, slow-forward, pause and other such video frame rates may be implemented via this technique. Video frame rates from 0.01 to 100.0 are possible for example. This is because, while video data frames may be generated in a predetermined temporal sequence (i.e. with a predetermined temporal frame separation), this predetermined inter-frame temporal relationship is only preserved during frame storage by applying an appropriate time stamp to each frame indicating the temporal separation between successive frames. According to the present invention this inter-frame temporal relationship may be modified by modifying the time-stamp existing in each stored video frame, or by applying a new time-stamp thereto, in such a way as to increase or reduce the inter-frame temporal spacing. Consequently, upon rendering of such modified frames, the rate of frame rendering is correspondingly increased or reduced.

The timestamp filter manipulates each frames time stamp to provide the Renderer with a continuous flow of frames in time. If the replay rate is increased the number of frames per second is kept the same as at normal rate but the frames which are passed to the Renderer are not in consecutive order e.g.

Normal rate

Frame No 0 1 2 3 4 5 6 7 8 9 . . . etc

2×Rate

Frame No 0 2 4 6 8 . . . etc

4×Rate

Frame No 0 4 8 . . . etc

The time stamp filter then recalculates the time that the Render should display the frame so that it maintains the required rate e.g.

2×Rate

Frame No 0 2 4 6 8 . . . etc

Time stamp ms 0.0 33.33 66.66 99.99 133.33

When the video is required to run slower each frame is read but the time stamp on each frame is divided by the rate so;

½ Rate

Frame No 0 1 2 3 4 . . . etc

Time stamp ms 0.0 66.66 133.33 200.0 266.66

To allow "odd" frame values the file reader reads frames by "frame" counting in a sequence of a 100 frames. The extracted frames then have their timestamps recalculated as above in the time stamp filter. This allows Rates from ¹⁄₁₀₀ Rate to 100×Rate.

The time stamp filter is also used in conjunction with the file reader to allow frame decimation. This allows the number of frames being transmitted to be reduced to fit into the available bandwidth e.g.

50% frame decimation

Frame No 0 2 4 6 8 . . . etc

Time stamp ms 0.0 66.66 133.33 200.0 266.66

The correct frame is played at the correct time but the intermediate frames are skipped. It is legitimate to have both Rate change and frame decimation so, 50% frame decimation, 2×Rate Frame No 0 2 4 6 8 . . . etc Time stamp ms 0.0 133.33 266.66 400.0 533.55

A load management module L (450) is operable to vary the load on the system, with the aim of reducing the number of frames being transmitted over the network to the maximum data transmission rate supported by the network and to the maximum rate at which video frames can be rendered at the replay node. This is achieved by the use of a data flow control software application contained in both the video storage node 3 and the video replay node 4. This is achieved by producing a frame decimation control signal 460 at the load management module 450 for input to the file reader application (34) in order to affect frame decimation as discussed above by skipping intermediate time-stamps and respective intermediate frames within a given video sequence at the time-stamp filter application (35).

Figure 6:
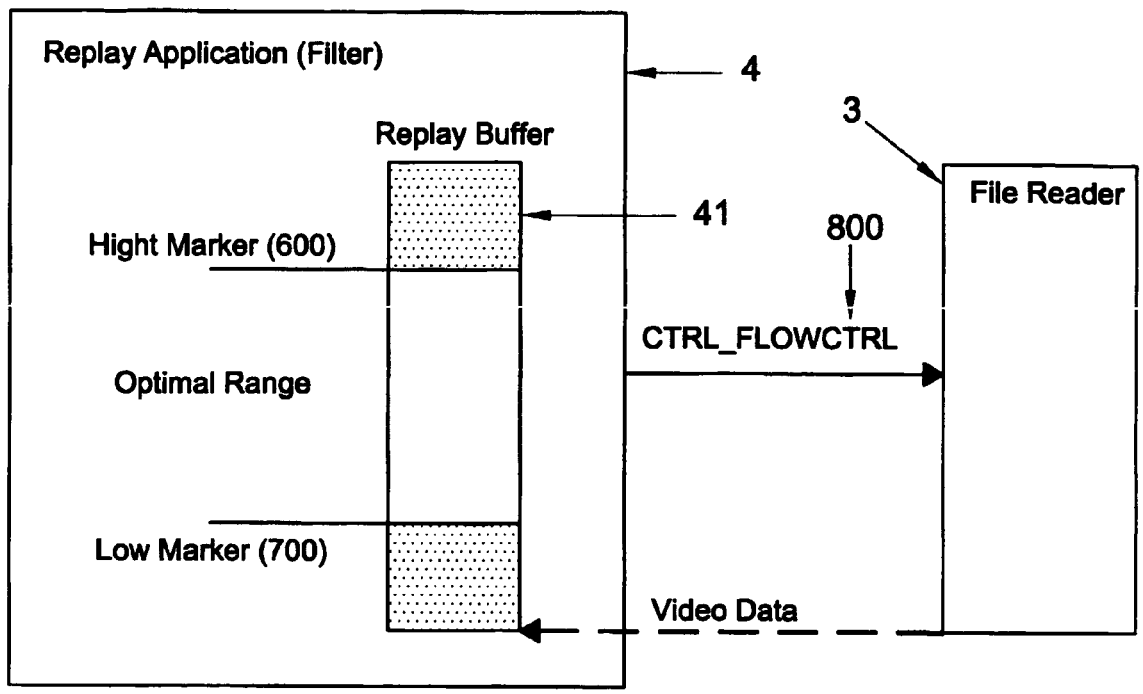
FIG. 6 illustrates a data flow control application as between a video storage node and a video replay node.

If the video renderer fails to render all of the frames sent to it then that only has the transmission time being wasted, but the renderer has been prevented from rendering frames by the necessity of receiving frames it cannot render. The data flow control means is operable to gather at the video replay node the contemporaneous rate of frame rendering thereat and the content of the receive buffer means thereof, and to transmit the gathered information to the video storage node (3). The data flow control software application at the video storage node is operable to reduce or increase the proportion of frames to be selected through decimation via the file reader software application (34) and the time-stamp filter application (35) from within a sequence of video frames to be transmitted to the video replay node. The degree of decimation is chosen according to the gathered information from the video replay node. The data flow control means at the video storage node (i.e. the load management module L) is operable to periodically increase the proportion of frames to be selected from a sequence of frames to be transmitted to the video replay node (i.e. by periodically reducing the degree of frame decimation) until the content value of the receive buffer of the video replay node exceeds a given content value represented by the "High Marker" (600) illustrated in FIG. 6. The data flow control software application at the video replay node is operable to gather and transmit the aforesaid contemporaneous data when the content value of its receive buffer (41) exceeds the "High Marker" content value (600), the data flow control means of the video storage node (3) being responsive to receipt of such gathered information so as to increase the frame decimation rate of the video sequence to be transmitted thereby to reduce the proportion of frames thereof being transmitted. Thus a steady decrease in frame decimation rates at the video storage node is punctuated by data flow control signals (800) from the video replay application (4) to the video storage node (3) whenever the content of the receive buffer (41) exceeds the "High Marker" content level with the result that frame decimation rates are increased in response thereto. An increase in frame decimation rates results in a slower "top-up" of the receive buffer (41) thereby allowing the video renderer of the video replay node to deplete the receive buffer to a degree sufficient to reduce the content value thereof below the "High Marker" value. A steady decrease in frame decimation rates follows each of the periodic increases in decimation rates thereby ensuring that the data flow rate across the network is periodically updated to cause the content level of the receive buffer (41) of the replay node (4) to hover/fluctuate around the High Marker content value.

Figure 7:
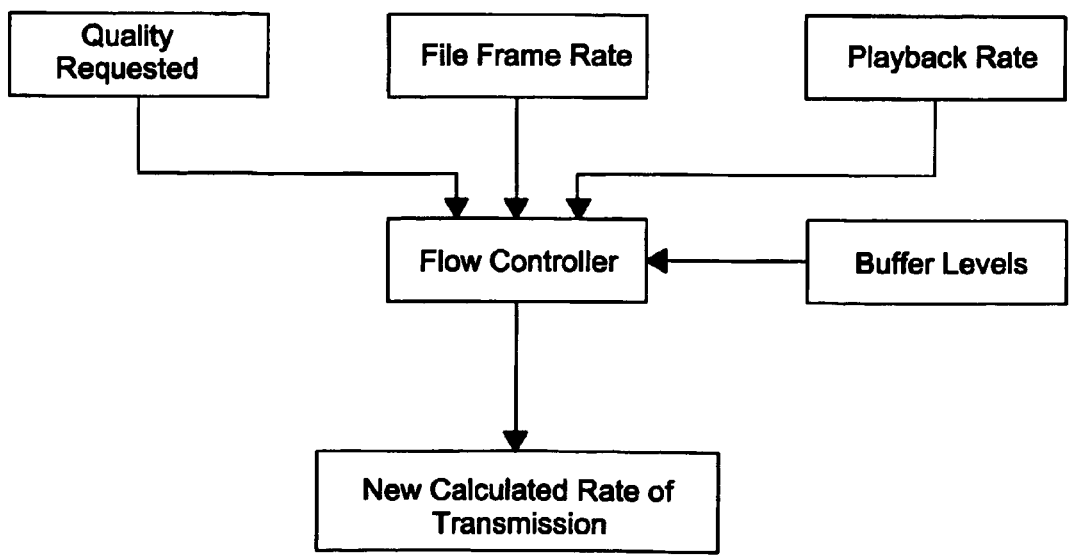
FIG. 7 schematically illustrates the calculation of a data flow control signal by a data flow control application.

In the event that the content value of the receive buffer (41) falls below the "Low Marker" content level (700) then the data flow control means is operable to transmit a control message (800) across the network communications means to the load management module L in response to which a flame decimation control signal (460) is generated to decrease frame decimation rates thereby increasing the rate of data transmitted to the receive buffer (41) of the video replay node. Four factors are taken into account when calculating new flame decimation rates (and therefore new data transmission rates) as illustrated in FIG. 7. The data flow control software application ("Flow Controller") gathers the following information:

the "Quality" of rendered video as selected by the user (i.e. a choice of frame decimation rate); the "File Frame Rate", being the frame rate of captured video data;

the "Playback Rate" of frames rendered at the renderer of the video replay node; and, the current content level of the receive buffer (41) of the video replay node. This information is gathered by the data flow control software application and input to the load management module (450) which calculates a new rate of data transmission based on this information and also a frame decimation control signal (460) via which to put effect to the new calculated data transmission rate. The data flow control software application at the video replay node gathers the renderer frame rate and the receive buffer content level and transmits that data to the load management module (450). When such gathered information is not being sent from the video replay node, the frame decimation rate is reduced continuously at a rate much slower than the rate of increase in frame decimation which results when the content level of the receive buffer (41) of the video replay node exceeds the High Marker level. This rapid rate of increase in frame decimation is typically ten times greater than the rate of subsequent decrease in frame decimation rates. This also allows for a slow network connection to be used by dropping the quality factor of rendered video data by increasing frame decimation rates. The data flow control means achieves this by monitoring the content value of the receive buffer (41) of the video replay node as follows. If the content level thereof exceeds the Higher Marker value, then a flow control signal is transmitted from the video replay node to the video storage node to increase frame decimation rates thereat. Conversely, if the buffer content value is lower than the Low Marker value then a flow control signal is transmitted to the video storage node to reduce frame decimation rates thereby increasing the rate of transmission of data to the receive buffer (41). All frame decimation rate updates may be operated at the end of a predetermined number of transmitted video frames (e.g. every 100 frames). This has the benefit of stopping unnecessary changes that are the result of transient changes in the rendering rate.

Figure 4:
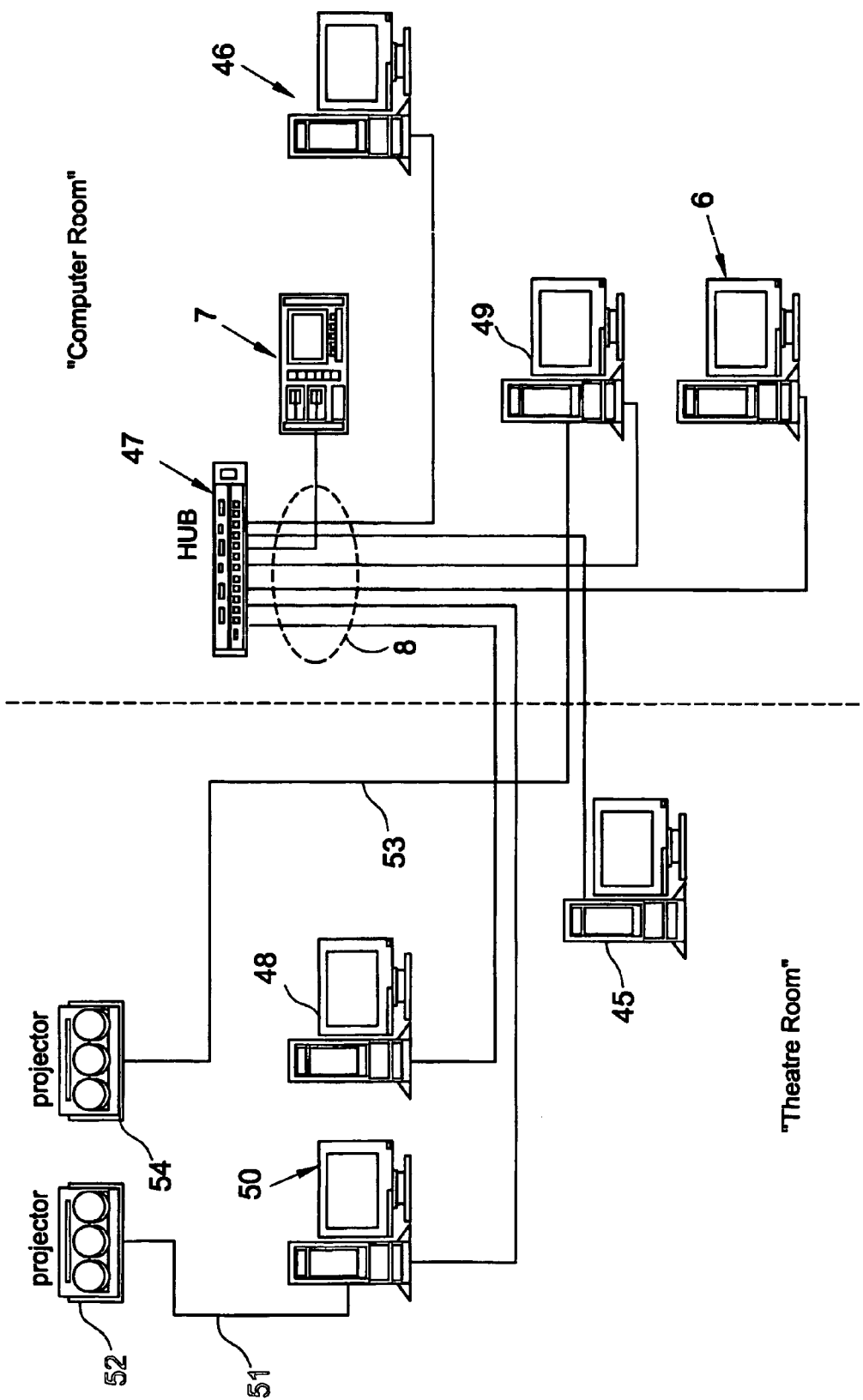
FIG. 4 schematically illustrates a computer network in a star network configuration comprising several video capture nodes, a video storage node, and several video replay nodes each aforesaid node being provided by a personal computer (PC)

FIG. 4 illustrates an example of the present invention in which the network node apparatus is arranged together with a network communications apparatus (8) in the form of a star network comprising a network switching hub apparatus (47). FIG. 4 also illustrates, schematically an example of the physical separation of network nodes permissible according to the present invention. The network hub apparatus (47), the computer (7) implementing the central network control application and providing the storage facility for video data, a first video capture node comprising a personal computer (46), a video replay node also comprising a personal computer (49), and a flight visual computer system (6) comprising a personal computer (for generating video display graphics) are each located in a "computer room". All other nodes of the network are located in a physically separate "theatre" room and include:

a second video capture node (45) comprising a personal computer connected to a PAL video camera via a video capture card; a host computer with a user interface means (48) comprising a personal computer operable to enable the user to control the network as a whole (e.g. the video storage and replay nodes at least); and, a second video replay node (50) also comprising a personal computer. Furthermore, the first video replay node (49) located in the computer room and the second video replay node (50) located in the theatre room are each arranged to control respective image projection apparatus (54 and 52 respectively) each of which is located within the theatre room, using suitable projector control signals (53 and 51 respectively) generated by the respective video replay nodes according to video data received thereat from the video storage node (7) located in the computer room. The first video capture node (46) is arranged to receive video data from a node (6) which is in the form of a PC arranged to generate real-time visual display graphics of high resolution component video at 1280×1024 at 60 Hz. The video is captured at a high frequency capture card in the first capture node (46).

Figure 5:
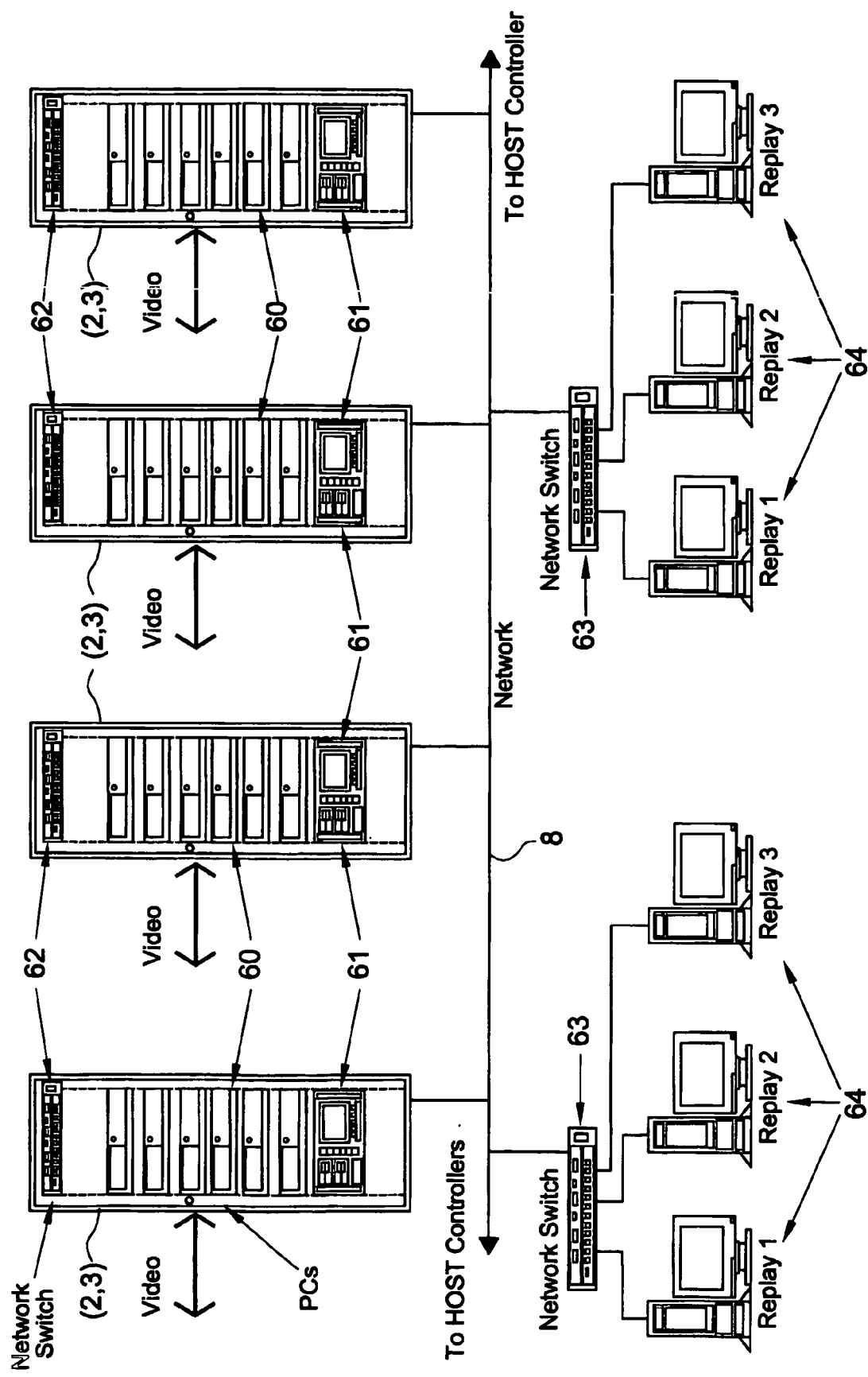
FIG. 5 schematically illustrates a computer network arranged in a bus topology comprising a plurality of video capture and video storage nodes and a plurality of video replay nodes each provided in the form of a personal computer arranged to communicate with video capture and video storage nodes via the bus communications network.

FIG. 5 illustrates a mixed network topology in which separate video capture nodes (2) and video replay nodes (3) are provided in the form of separate personal computer apparatus forming a star topology about a common network switching hub (62). Each such star network has a dedicated central (star) network control application and video storage (61). Four such star network topologies are illustrated in FIG. 5 and each is connected to a main Gigabit network backbone (8) to which are also connected two separate star networks each comprising a dedicated network switch hub (63) and three separate video replay nodes (64) connected thereto, each comprising a personal computer with a visual display unit attached thereto. Host computers, for controlling the use of the network apparatus are also connected to the Gigabit backbone network (8) but are not shown in FIG. 5 for purposes of clarity.

The PC's (60) are each capable of both capturing and generating high resolution component video data up to 1280×1024 at 60 Hz. The captured video is stored on the servers (61). The video capture application passes captured video data through a video compressor and then on to a transmit filter software application where it is then sent to a server. At a server the received video is written to a disk video storage means by a file writer software application.

Thus, a large network of node network apparatus, according to the present invention, may be provided comprising multiple video capture, video storage and video replay applications spread across multiple machines. Video replay nodes may be distributed across a LAN and a WAN. Software compression and decompression in the video capture and video replay nodes may be implemented using software compression and decompression instead of hardware thereby allowing flexibility in matching compression and decompression methods to video contents. General-purpose hardware may be used to implement any of the software applications of the present invention thereby allowing greater flexibility and reducing the need to employ bespoke hardware. In particular, the network-based architecture of the video capture, video storage and video replay applications, and also of the network diagnostics and central control applications, allows computational load to be spread across the network thereby reducing the load required of each node apparatus and consequently enabling higher video data transmission rates to be employed. The use of buffering, according to the present invention, as between video capture, video storage, and video replay applications decouples the synchronous capture and replay elements and allows an asynchronous application of the components across general-purpose computer networks that would otherwise introduce intermittent data delays and the consequent "frame jitter" that results.

The network node apparatus according to any aspect of the present invention may be designed for high fidelity recording and replay of video and sound. The video data may comprise any of the following signal types in any mix: high-frequency, component video up to 1600×1200 at 60 Hz in 24 bit or 16 bit RGB and 8 bit Monochrome Composite Colour; S-Video PAL or NTSC in 24 bit, or 16 bit RGB and 8 bit Monochrome and Sound using standard PC or microphone inputs. The network node apparatus, in any aspect of the invention, may utilise standard commercial PC workstations and servers thereby making the system flexible and expandable. Any of the software applications referred to above may be executed on any Windows 2000 based PC (Windows XP, derivatives thereof or any suitable software, such as would be readily apparent to the skilled person, may be employed).

It is to be understood that modifications or variations of the embodiments described hereinabove, such as would be readily available to the skilled person, may be made without departing from the scope of the present invention.

The invention claimed is:

1. Network apparatus for the storage and replay of video data at separate nodes interconnected via a communications network, the apparatus comprising:

a video storage node arranged to store video data and to transmit stored video data via the communications network;

a video replay node arranged to receive, via the communications network, video data transmitted by the video storage node, and to render an image therefrom;

wherein the video storage node has a transmit buffer configured to temporarily retain stored video data, and the video replay node has a receive buffer configured to temporarily retain the received video data, the video storage node being operable to transmit video data to the video replay node only if the content of the transmit buffer matches or exceeds a predetermined lower content value and the content of the receive buffer does not exceed a predetermined upper content value; and wherein the predetermined upper content value is determined such that the receive buffer comprises an unused data capacity of two times the product of the video transmission rate and the duration of a whole video frame.

2. The network apparatus according to claim 1 wherein:
the video storage node is arranged to transmit data temporarily stored in the transmit buffer thereof at the maximum data transmission rate supported by the communications network.

3. The network apparatus according to claim 1 further including:
a video capture node for capturing video data representing an image, and arranged to transmit such video data via the communications network to the video storage means, wherein the video storage node is arranged to receive said video data transmitted from the video capture node for said storage thereof.

4. The network apparatus according to claim 3 wherein:
the video capture node has a transmit buffer for temporarily retaining said captured video data and the video storage node has a receive buffer for temporarily retaining video data received thereby, the video capture node being operable to transmit video data to the video storage node only if the content of transmit buffer matches or exceeds a predetermined lower content level and the content of the receive buffer of the video storage node does not exceed a predetermined upper content level.

5. The network apparatus according to claim 4 wherein:
the video capture node is arranged to transmit data temporarily retained in the transmit buffer thereof at the maximum data transmission rate supported by the communications network.

6. The network apparatus according to claim 1, wherein the predetermined lower content value corresponds to the content of the respective transmit buffer when empty.

7. The network apparatus according to claim 1, wherein:
the video replay node includes transmission control means arranged to detect when the content value of the receive buffer thereof matches or exceeds the predetermined upper content value and to communicate such detection via the network to the video storage node as a first detection signal; and
the video storage node includes transmission control means arranged to receive first detection data from the video replay node, to generate a second detection signal when the content value of the transmit buffer thereof does not exceed the predetermined lower content value, and to prevent video data transmission from the video storage node to the video replay node in response to either receipt of the first detection signal or in response to generation of the second detection signal.

8. The network apparatus according to claim 3 wherein:
the video storage node includes transmission control means arranged to detect when the content value of the receive buffer thereof matches or exceeds the predetermined upper content value and to communicate such detection via the network to the video capture node as a first detection signal; and,
the video capture node includes transmission control means arranged to receive first detection data from the video storage node, to generate a second detection signal when the content value of the transmit buffer thereof does not exceed the predetermined lower content value, and to prevent video data transmission from the video capture node to the video storage node either in response to receipt of the first detection signal or in response to generation of the second detection signal.

9. The network apparatus according to claim 1, wherein the video replay node includes video replay selection means for selecting the replay rate of video images to be rendered thereby and for conveying said selection to the video storage node via the communications network, and wherein the video storage node includes time-stamp control means for applying a time-stamp to video data stored therein according to the selected video replay rate, such that video images rendered by the video replay node using video data with said time-stamp are rendered at the selected video replay rate.

10. The network apparatus according to claim 1, further comprising said communications network.

11. The network apparatus according to claim 1, further comprising said communications network wherein said communications network couples the video storage node to the video replay node thereby placing the video storage node in asynchronous communication with the video replay node.

12. The network apparatus according to claim 3 further comprising the communications network wherein the communications network couples the video capture node to the video storage node thereby placing the video storage node in asynchronous communication with the video replay node.

13. The network apparatus according to claim 1, wherein each node is a computer separate from any other node.

14. A method for the storing and replaying of video data at separate nodes of a communications network arranged to couple the nodes, wherein the method includes the steps of:
storing video data at a video storage node;
temporarily retaining the stored video data in a transmit buffer of the video storage node; and subsequently:
transmitting the retained video data via the communications network;
receiving at a video replay node the video data transmitted by the video storage node;
temporarily retaining said received video data in a receive buffer of the video replay node; and subsequently:
rendering an image at the video replay node using the received video data;
wherein said transmission of video data from the video storage node to the video replay node occurs only if the content of the transmit buffer matches or exceeds a predetermined lower content value and the content of the receive buffer does not exceed a predetermined upper content value; and
wherein the predetermined upper content value is determined such that the receive buffer comprises an unused data capacity of two times the product of the video transmission rate and the duration of a whole video frame.

15. The method according to claim 14, wherein the transmission of retained data from the storage node occurs at the maximum data transmission rate supported by the communications network.

16. A method according to claim 14 further including:
capturing at an video capture node video data representing an image,
transmitting captured video data via the communications network to the video storage means,
receiving at the video storage node said captured video data transmitted from the video capture node for said storage thereof.

17. The method according to claim 16, including:
temporarily retaining captured video data in a transmit buffer of the video capture node, transmitting said retained video data via the communications network, receiving at the video storage node said data transmitted by the video capture node, temporarily retaining said received data in a receive buffer of the video storage node, and wherein the transmission of video data from the video capture node to the video storage node occurs only if the content of transmit buffer thereof matches or exceeds a predetermined lower content level and the content of the receive buffer of the video storage node does not exceed a predetermined upper content level.

18. The method according to claim 17, wherein the transmission of the retained video data from the video capture node occurs at the maximum transmission rate supported by the communications network.

19. The method according to claim 14, wherein the predetermined lower content value corresponds to the content of the transmit buffer when empty.

20. The method according to claim 14, including:

detecting at the video replay node when the content value of the receive buffer matches or exceeds the predetermined upper content value, and communicating such detection via the network to the video storage node as a first detection signal; and receiving at the video storage node first detection data from the video replay node, generating a second detection signal when the content value of the transmit buffer thereof does not exceed the predetermined lower content value, and preventing video data transmission from the video storage node to the video replay node either in response to receipt of the first detection signal or in response to generation of the second detection signal.

21. The method according to claim 16, including:

detecting at the video storage node when the content value of the receive buffer matches or exceeds the predetermined upper content value, and communicating the detection via the communication network to the video capture node as a first detection signal; and receiving at the video capture node a first detection signal from the video storage node, generating a second detection signal when the content value of the transmit buffer thereof does not exceed the predetermined lower content value, and preventing video data transmission from the video capture node to the video storage node either in response to receipt of the first detection signal, or in response to generation of the second detection signal.

22. The method according to claim 14, including:

selecting at the video replay node the replay rate of video images to be rendered thereby, communicating said selection to the video storage node via the communications network, and applying a time-stamp to video data stored in the video storage node according to said selection, wherein video images rendered by the video replay node using video data with the time-stamp are rendered at the selected video replay rate.

23. The method according to claim 14, including asynchronously communicating between said nodes of the communications network.

24. A computer readable medium comprising computer program including computer code when executed by a processor implement a method according to claim 14.

25. A computer network including a plurality of separate network nodes, each of which includes a computer programmed to implement collectively a method according to claim 14 with a computer of at least one of said plurality of network nodes.

* * * * *